340-870.15 SR
OR 2,918,665
SEARCH ROOM

Dec. 22, 1959 H. T. HAYES ET AL 2,918,665

MODULATION METHOD AND SYSTEM

Filed April 8, 1955 6 Sheets-Sheet 1

INVENTORS
HARRY THEODORE HAYES
GEORGE BRUER CRANE
BY Edward Kendrick
ATTORNEY

INVENTORS
HARRY THEODORE HAYES,
GEORGE BRUER CRANE,

BY Edward Kendrick
ATTORNEY

PHASE DETECTOR OUTPUT AS A FUNCTION OF PHASE ANGLE θ BETWEEN INPUTS Sdata & Sref.

INVENTORS
HARRY THEODORE HAYES
GEORGE BRUER CRANE
BY Elwood McKendrick
ATTORNEY

MODULATION METHOD AND SYSTEM

Filed April 8, 1955 6 Sheets-Sheet 4

INVENTORS
HARRY THEODORE HAYES
GEORGE BRUER CRANE
BY
Edward J. Kendrick
ATTORNEY

MODULATION METHOD AND SYSTEM

Filed April 8, 1955 6 Sheets-Sheet 5

INVENTORS
HARRY THEODORE HAYES
GEORGE BRUER CRANE
BY
Elwood [signature]
ATTORNEY

MODULATION METHOD AND SYSTEM

Filed April 8, 1955 6 Sheets-Sheet 6

INVENTORS
HARRY THEODORE HAYES
GEORGE BRUER CRANE
BY
Edward McKendrick
ATTORNEY

United States Patent Office 2,918,665
Patented Dec. 22, 1959

2,918,665

MODULATION METHOD AND SYSTEM

Harry Theodore Hayes, Hawthorne, and George Bruer Crane, Redondo Beach, Calif., assignors to Gilfillan Bros. Inc., Los Angeles, Calif., a corporation of California Application April 8, 1955, Serial No. 500,083

8 Claims. (Cl. 340—184)

This invention relates to a method of and apparatus for developing one or more amplitude modulated signals corresponding to data representing signals, and more particularly to a method of producing an amplitude modulated signal having an amplitude corresponding to the magnitude of the data representing signals and having a phase with respect to a corresponding reference signal representative of the algebraic sign of the data representing signal, and demodulating the amplitude modulated signals to derive the data representing signal.

While the present invention may have a multitude of applications, it is particularly useful in the field of automatic aircraft control where a data link for telemetric signals must be maintained between a target or aircraft to be controlled and a remote location. In a specific situation, for example, the invention may be employed as part of a data link in an automatic ground-controlled approach system of the type described in copending U.S. patent application Serial No. 265,977, for "Range and Angle Tracking of Aircraft Using Angle Gated Video," by Alvin Guy Van Alstyne," filed January 11, 1952.

In conventional telemetering systems where a plurality of control or information-bearing signals are to be transmitted, a different carrier or subcarrier frequency is specified for each signal. The different data or control signals which are transmitted are then separated at the receiver through respective filter sections.

In general, in prior art systems the amplitude and sign of the signal to be transmitted are encoded as a level referenced to a zero-representing level. It is thus necessary to re-establish the zero-representing level at the receiving location. This prior art type of encoding may therefore be considered to be "signed-value" encoding since the signal value includes both amplitude and sign (polarity). The "signed value" encoding technique is disadvantageous in that any drift in the reference or zero representing signal which is established—either at the transmitter or at the receiver—introduces an error which may affect the amplitude and even the sign of the signal involved. Thus an error in sign even of short duration may cause a desired control to be effected in the wrong sense. Consequently, the problem of "hunting" is accentuated in a typical "closed loop" control situation.

The above-described amplitude modulated signals produced in accordance with the invention are in turn employed to modulate a carrier wave which must normally thereafter be demodulated twice to produce the data representing signals. However, according to the present invention, a novel method of auto-correlating phase comparison is provided to distinguish or select different encoded or amplitude modulated signals as well as to provide an accurate indication of the algebraic sign and magnitude of the respective data representing signals. It is, in fact, an advantage of the invention that signal selection by auto-correlating phase comparison and demodulation of the amplitude modulated signals may be performed by the same apparatus.

According to the basic concept of the invention, the data signals to be transmitted are utilized to modulate a sinusoid or similar periodic reference signal to produce an encoded signal having an amplitude corresponding to the absolute value of the corresponding data signal and an in-or-out of phase relationship with respect to a reference signal according to the sign of the data signal. The reference signal and its corresponding amplitude modulated counterpart bearing the data are of the same predetermined frequency. Effectively each encoding operation then requires that two signals be generated for each data signal. The carrier wave is demodulated conventionally to produce the sum of the encoded data signals. This sum is then impressed on a number of phase detectors equal to the number of data representing signals. Each phase detector is also provided with a corresponding reference signal input. The output of each phase detector then results in both data signal selection and data signal demodulation because the output of a phase detector is always proportional in amplitude to its corresponding data signal and has the corresponding algebraic sign.

A plurality of control or other information-bearing signals may be encoded in this manner and mixed for transmission through a single telemetering channel. The respective data signals then may be separated and the corresponding signs thereof decoded in a simple operation where a phase detector is utilized to compare the reference signal corresponding to the data signal to be separated and the mixed encoded data signals in a manner which automatically auto-correlates all signals by effectively taking the integral thereof and results in an ouput signal representing the signed-amplitude of the desired data signal.

According to the basic decoding method provided by the invention, the mixed data signals encoded in the above-described manner are applied in parallel to a corresponding number of phase detector circuits. In a simultaneous operation the reference signals associated with the data signals to be separated are detected and are applied to respective phase detectors associated with the corresponding data signal. According to the invention, the reference signal is amplified at the receiver so that it is many times that of the corresponding data signal, in the order of a ratio of 5 to 1. As a result, it will be shown, the method of the invention makes it possible to obtain an output signal from the phase detector where signals which are not of the reference signal frequency are effectively reduced to zero, by what may be considered to be an auto-correlating integration, and the desired data signals are passed through and detected.

More specifically, it will be shown, according to the invention, that the utilization of a large reference-signal-to-data-signal ratio in the order of 5 to 1 makes it possible to utilize a phase detector to remove by auto-correlation discrimination all unwanted signals and to produce an output signal $S_{out}$ which may approximately be defined as a function of the data signal $S_{data}$ as follows:

$$S_{out}=KS_{data}\cos\theta$$

where $\theta$ represents phase angle between the reference signal and the data signal. However, since according to the encoding method of the invention $\theta$ is either zero or 180°, depending upon the sign, it is evident that the phase detection method of decoding provides an output signal which very accurately corresponds to the amplitude of the data signal $S_{data}$ and has a sign corresponding to the sign of the encoded data signal.

Thus in this manner a plurality of data signals may be accurately represented in absolute magnitude and sign and then separated without the necessity of a corresponding plurality of filter circuits.

In a particular arrangement of the invention, the encoding means may include a relay chopper circuit where the transfer contact of a relay is periodically switched from one contact to another under the control of the corresponding reference frequency signal. One of the contacts of the relay receives the data signal to be transmitted, and another contact may be utilized to combine a fixed value with the data signal, as for example an integral signal to provide an offset value. Where the integral signal is not utilized, the second contact receives a fixed reference signal such as ground potential. In this manner a squarewave signal is produced which has an amplitude corresponding to that of the absolute value of the data signal to be encoded, or the difference between the data signal and offset signal, where the two signals are combined; and the sign of the pre-chopper relay data signal results in an in-or-out-of phase relationship between the reference signal, utilized to actuate the chopper relay, and the squarewave data output signal which results. The squarewave signal then may be converted to a corresponding sinusoid suitable for modulating a carrier, by means of relatively simple and well-known filtering techniques.

The data signals encoded in this manner may be decoded for monitoring purposes at the transmitter in order to ensure that the proper conversion has been performed. In this operation a phase shifter is utilized to compensate for any unwanted phase shift resulting from the encoding of the data signals and is varied until the decoding circuits at the receiver indicate the proper reference has been established. In this manner then the absolute magnitude and sign of the data signals may be very accurately encoded and signals thus encoded are not subject to errors due to the drifting of reference signals as in the above-mentioned conventional systems.

While the invention may employ the circuit configuration of a conventional phase detector circuit at the decoding location, the operation of the circuit according to the method of the invention results in an entirely novel function. The phase detector utilized according to the present invention does not detect phase but rather utilizes the normal phase detecting operation to remove signals at unwanted frequencies through auto-correlation discrimination and therefore effectively becomes a signal separating device. Moreover, the operation of the phase detector in the manner prescribed by the invention results in amplitude and sign detection, according to the method introduced herein.

Accordingly, it is an object of the present invention to provide a method for encoding information-bearing signals in a manner making it unnecessary to re-establish a zero-representing signal at the receiving location.

Another object of the invention is to provide means for encoding data signals where the sign and absolute value of the data signals are separately transmitted, obviating the errors normally present where the sign and amplitude are mixed.

A further object is to provide a method for encoding and/or decoding a plurality of data representing signals where the complexity of the corresponding plurality of filter circuits is not required for separating the signals at the receiver.

Yet another object is to provide a circuit for encoding and/or decoding a plurality of information-bearing signals where an auto-correlating phase comparison technique is utilized to separate the signals for utilization, obviating the necessity of a plurality of complicated filter circuits and automatically providing an output signal accurately representing the signed amplitude of the desired data signal.

A more specific object of the invention is to provide a method for encoding and/or decoding a plurality of data representing signals where each data-representing signal is represented by a periodic signal having an amplitude corresponding to the absolute value of the data signal, and a reference signal having the same frequency as the data signal.

Another more specific object of the invention is to provide means for decoding a plurality of data representing signals which have been mixed for transmission through a single telemetering channel where each data signal ($S_{data}$) may be detected separately through a phase detector by comparing the data signal with a reference signal of much greater amplitude but of the same frequency providing an output signal according to the function: $S_{out}=KS_{data}\cos\theta$.

The novel features which are believed to be characteristic of the invention, both as to its organization and method of operation, together with further objects and advantages thereof, will be better understood from the following description considered in connection with the accompanying drawings. It is to be expressly understood, however, that the drawings are for the purpose of illustration and description only and are not intended as a definition of the limits of the invention.

Figure 1:
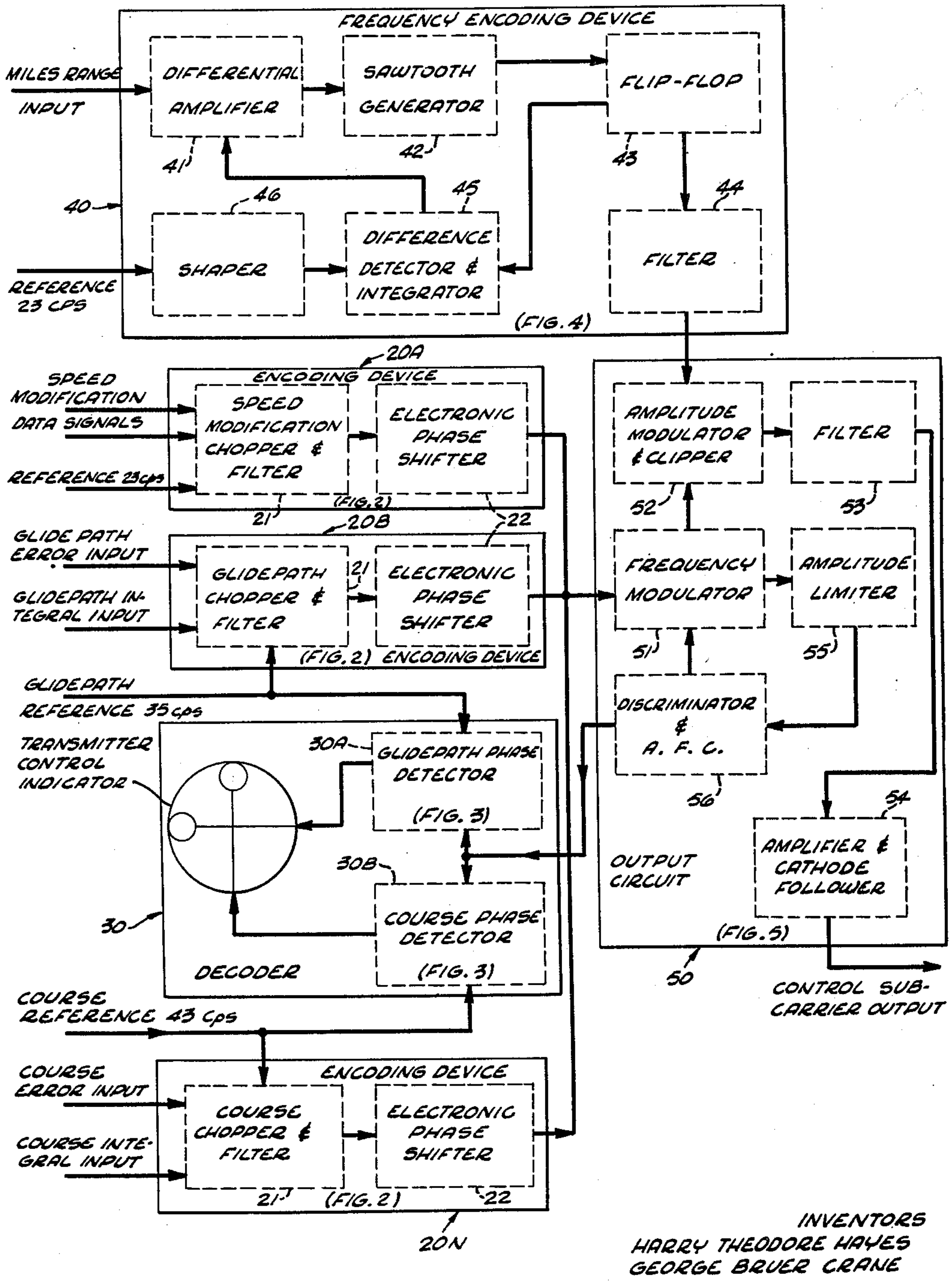
Fig. 1 is a block diagram illustrating a typical arrangement of the encoding circuits of a transmitter section utilizing the encoding method of the invention.
Figure 3:
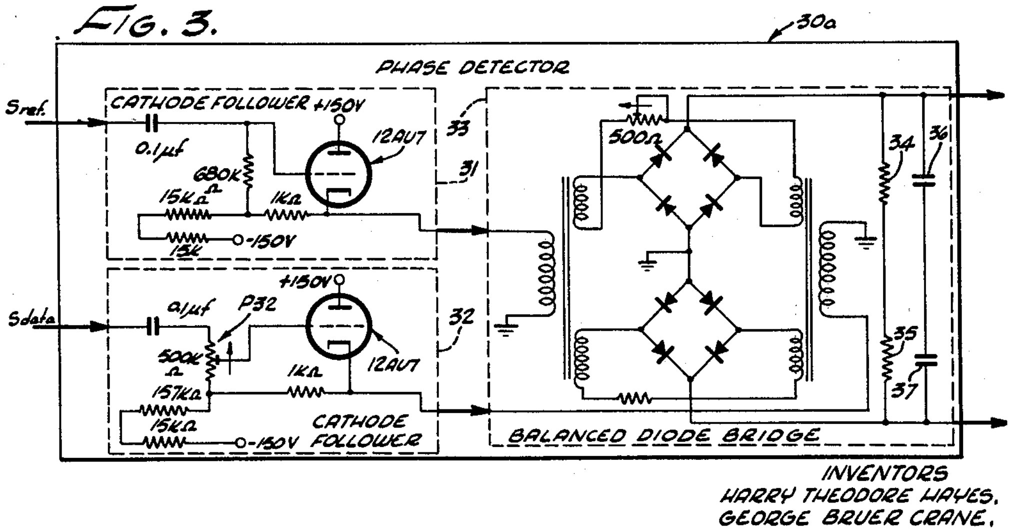
Fig. 3 is a schematic diagram of a suitable form of phase detector circuit which may be utilized in accordance with the decoding method of the invention.
Figure 3A:
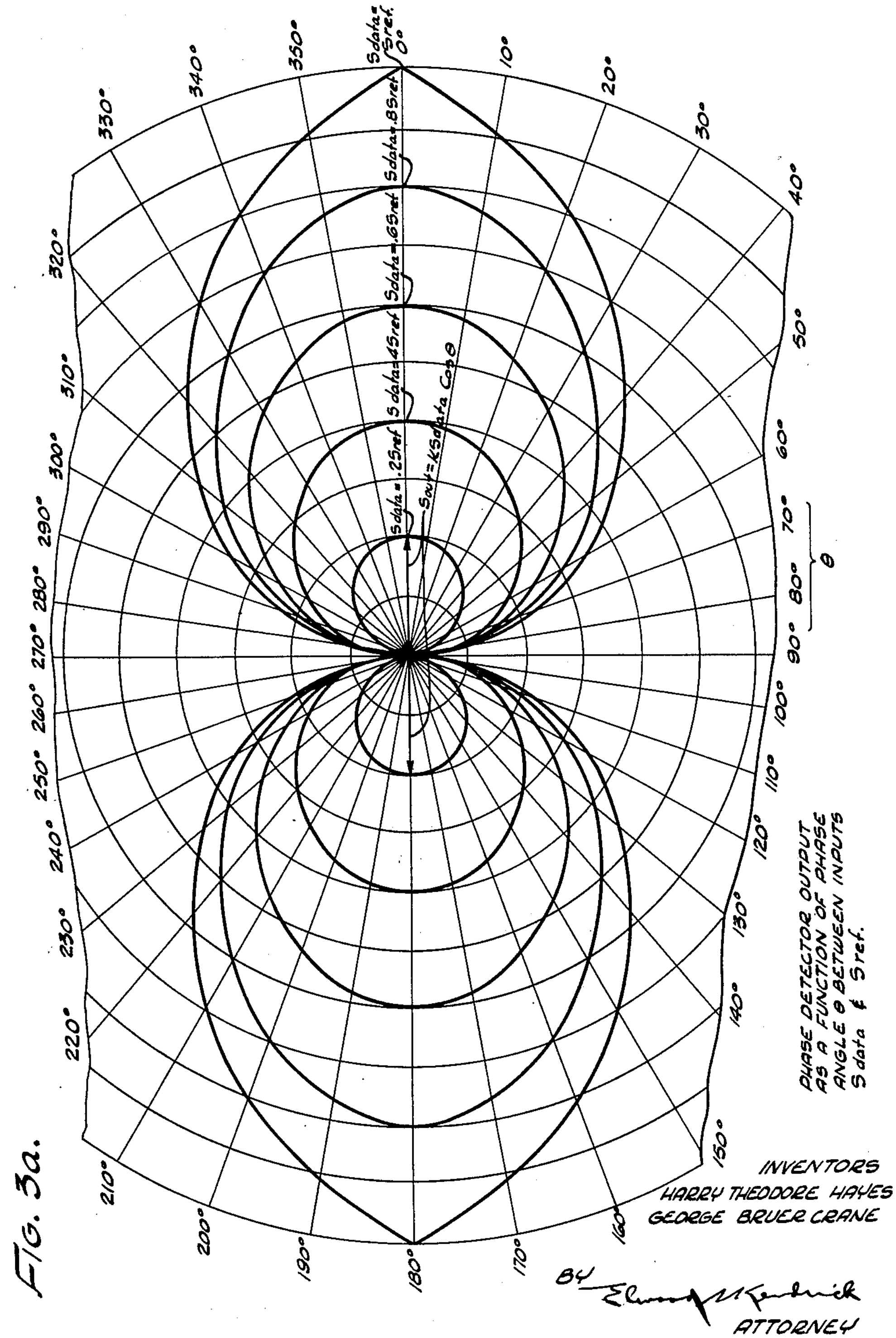
Figures 4, 7:
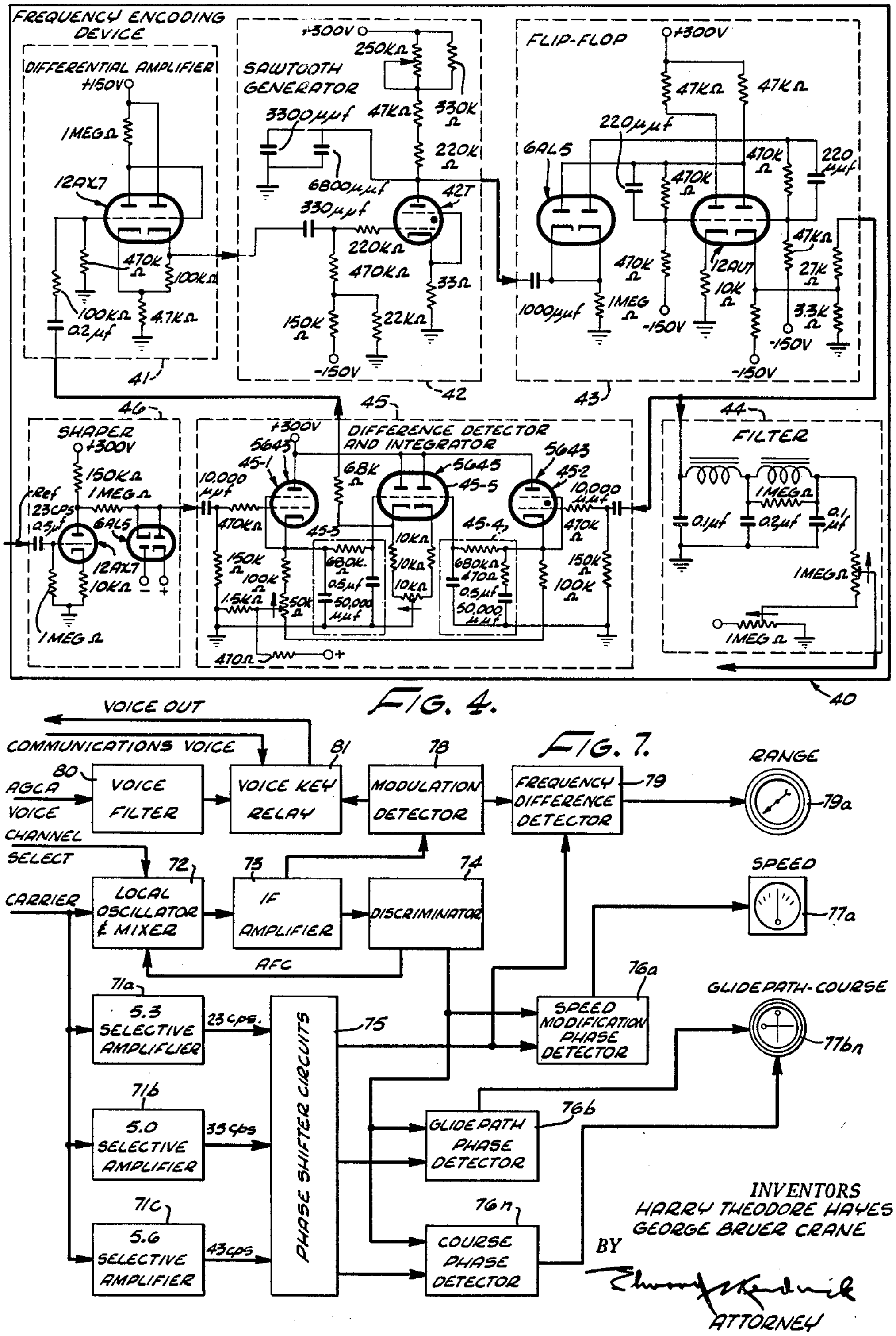
Figure 5:
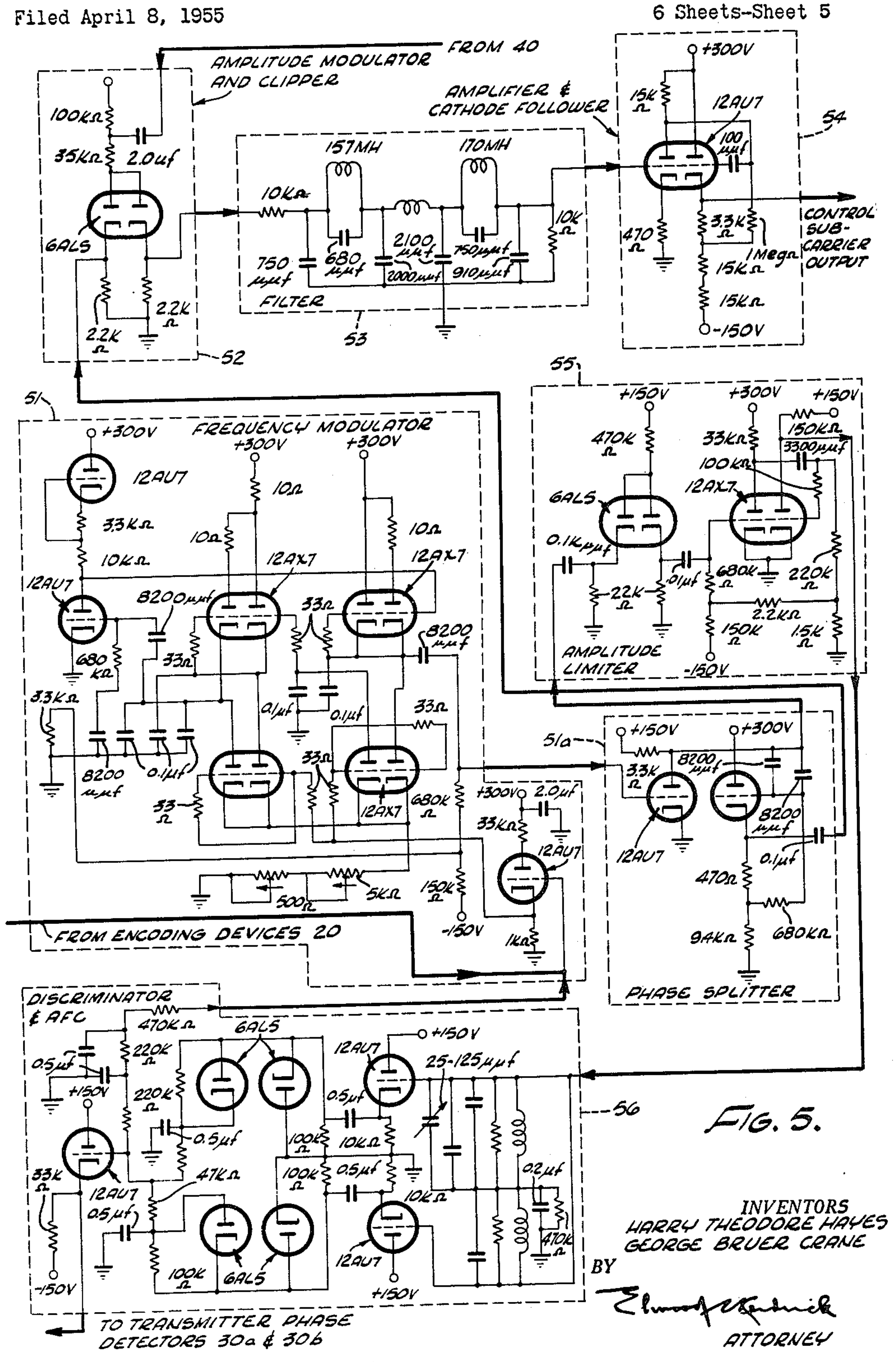
Figure 6:
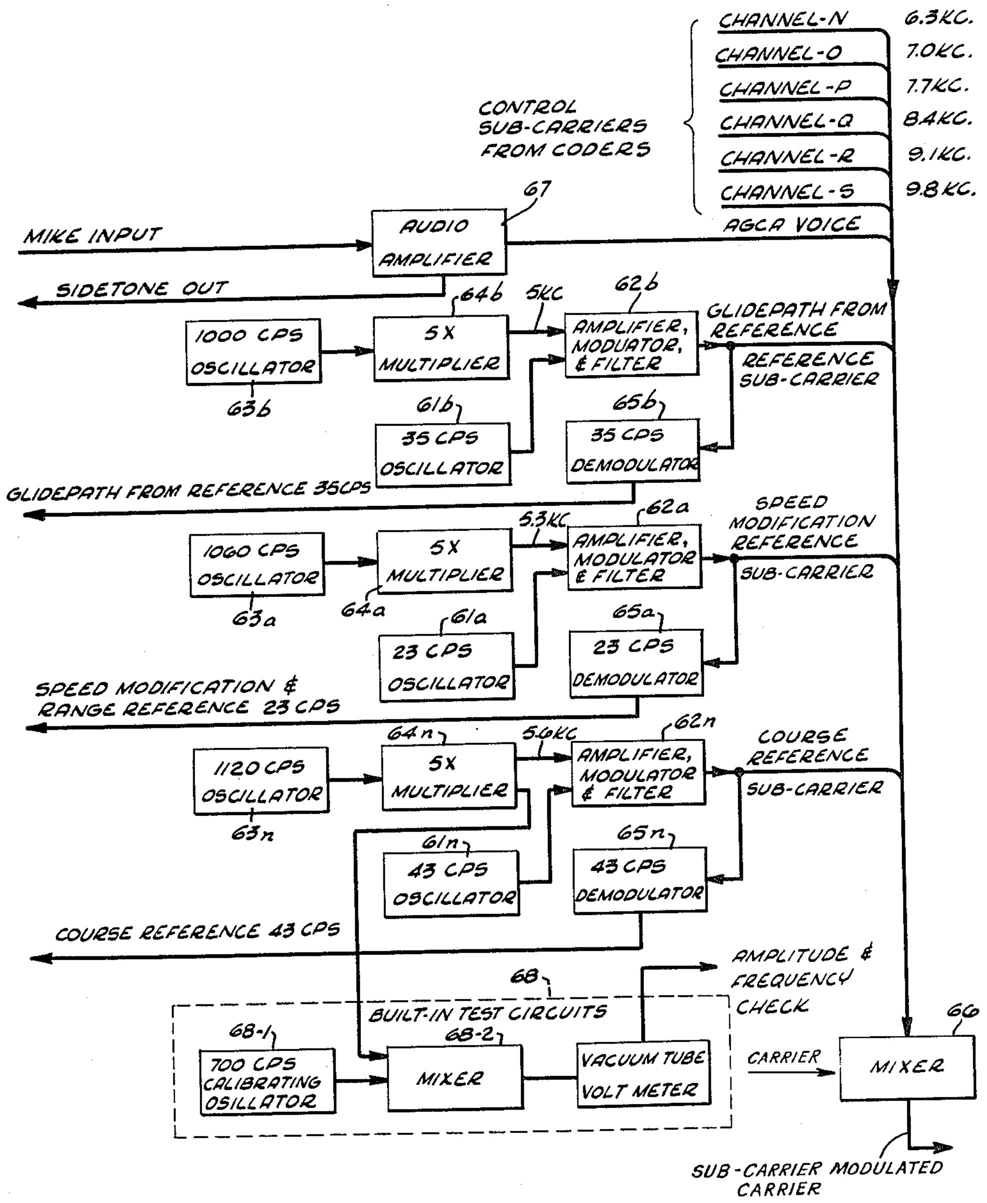

Fig. 3*a* is a chart indicating the output signal of the phase detector circuit of Fig. 3 for various ratios and phase angles $\theta$;

Fig. 4 is a schematic diagram of a form of range signal to frequency encoder suitable for utilization in the transmitter section shown in Fig. 1;

Fig. 5 is a schematic diagram of a form of modulator and output circuit suitable for utilization in the transmitter section of Fig. 1;

Fig. 6 is a block diagram indicating a typical arrangement of a transmitter section providing frequency reference signals according to the present invention, as well as certain other signals which may be utilized in a particular application; and Fig. 7 is a block diagram illustrating a typical arrangement of a receiver utilizing the decoding and separating method of the invention where a phase detector circuit is utilized to auto-correlate a plurality of mixed data signals.

Reference is now made to Fig. 1 wherein the general form of a transmitter section utilizing the basic encoding method of the invention is shown in block diagram form. The diagram of Fig. 1 is arranged to indicate the general component sections required in the encoding transmitter section as well as specific signals which may be encoded in a typical arrangement where the invention is utilized to provide a data link for controlling an aircraft in an automatic ground-controlled approach system.

In Fig. 1 three encoding devices 20A, 20B, and 20N are shown connected to an output circuit, another input signal of which is provided by a frequency encoding device 40. Output circuit 50 provides a control subcarrier output. Three reference signals of frequencies 23, 35 and 43 cycles per second are employed to modulate 5.3, 5.0 and 5.6 kilocycles respectively as indicated in the reference frequency transmitter section and mixer of Fig. 6. The 5.3, 5.0 and 5.6 kilocycles modulated signals are then employed to modulate with control subcarrier output signals from, for example, a plurality of output circuits identical to the circuit 50 in a mixer 66 shown in Fig. 6 and transmitted to a receiver arrangement shown in Fig. 7. In the particular example shown, the receiver arrangement of Fig. 7 is airborne, and the transmitter including all the components shown in Figs. 1 and 6 are ground based.

Three features of the invention are particularly illustrated in Figs. 1, 2, 6 and 7. The first feature relates to the use of a special encoding device shown in the schematic diagram of Fig. 2. The second feature of the invention resides in the use of several encoding devices 20A, 20B and 20N shown in Fig. 1, the outputs of which are combined in output circuit 50 and transmitted to a receiver arrangement as indicated in Fig. 7 with the reference output signals of the reference frequency transmitter section and mixer of Fig. 6. By the use of the special encoding devices 20A, 20B and 20N, which produce an output signal having a fundamental frequency equal to that of the reference signal input frequency, an in- or out-of-phase relationship with the reference frequency dependent upon the algebraic sign of the data representing signals, it is possible to combine the amplitude modulated signals in output circuit 50, transmit them with the reference output signals of the reference frequency transmitter section and mixer of Fig. 6 to the receiver arrangement of Fig. 7 where each of the output signals of encoding devices 20 may be separated and detected simultaneously by phase detectors indicated at *76a*, *76b*, and *76n* in Fig. 7.

Another feature of the invention resides in the use of a plurality of systems identical to the one shown in Fig. 1 and a single reference frequency transmitter section and mixer shown in Fig. 6 to provide reference signals for any one of a plurality of airborne receiver arrangements of the same type shown in Fig. 7.

The specific function of encoding devices 20 will be set out in detail hereinafter. The function of frequency encoding device 40 is simply to provide additional information in the form of amplitude modulation of a carrier produced by a frequency modulator 51 and output circuit 50. Output circuit 50 including frequency modulator 51 is employed basically simply as a sub-carrier frequency modulator.

Reference frequency transmitter section and mixer of Fig. 6 produces three reference frequencies specifically of 23, 35 and 43 cycles per second which are impressed upon encoding devices 20 and are also transmitted by modulation of 5.35 and 5.6 kilocycle signals. The receiver arrangement of Fig. 7 then separates the 23, 35 and 43 cycle per second reference signals and compares them with an appropriate demodulated sub-carrier, the modulation of which includes the modulation by encoding devices 20. These are provided at the output of discriminator 74 shown in Fig. 4. All these are impressed upon phase detector 76 which also are provided with the reference signal 23, 35 and 43 cycle per second reference signal inputs respectively.

*Encoding Devices 20*

As indicated in Fig. 1, data signals are applied to respective encoding devices 20A, 20B and 20N, which provide corresponding encoded output signals. The notation 20N is utilized to indicate that the number of encoding devices may be varied as desired. It will be noted that each encoding device also receives a reference frequency signal which is effectively modulated by the corresponding data signal and provides a sign reference and separating reference as will be more fully explained below. Thus in the particular aircraft control situation which is illustrated, a speed modification data signal and a corresponding reference frequency signal of 23 c.p.s. are applied to encoding device 20A; a glide path error input signal and glide path integral input signal are applied to an encoding device 20B, actuated by a glide path reference signal indicated to be 35 c.p.s.; and a course error input signal and course integral input signal are applied to encoding device 20N which also receives a course reference frequency signal of 43 c.p.s.

Encoding devices 20 are indicated to include chopper and filter circuits 21 and electronic phase shifters 22 which are utilized in a manner more specifically described below to ensure the proper sign-indicating phase relationship between the encoded signal and the corresponding reference signal as it is transmitted.

It will be understood, of course, that the particular application illustrated and that the specific subcomponents forming devices 20 are not intended as limiting features of the invention since the encoding method provided may assume a multitude of other mechanizations.

Figure 2:
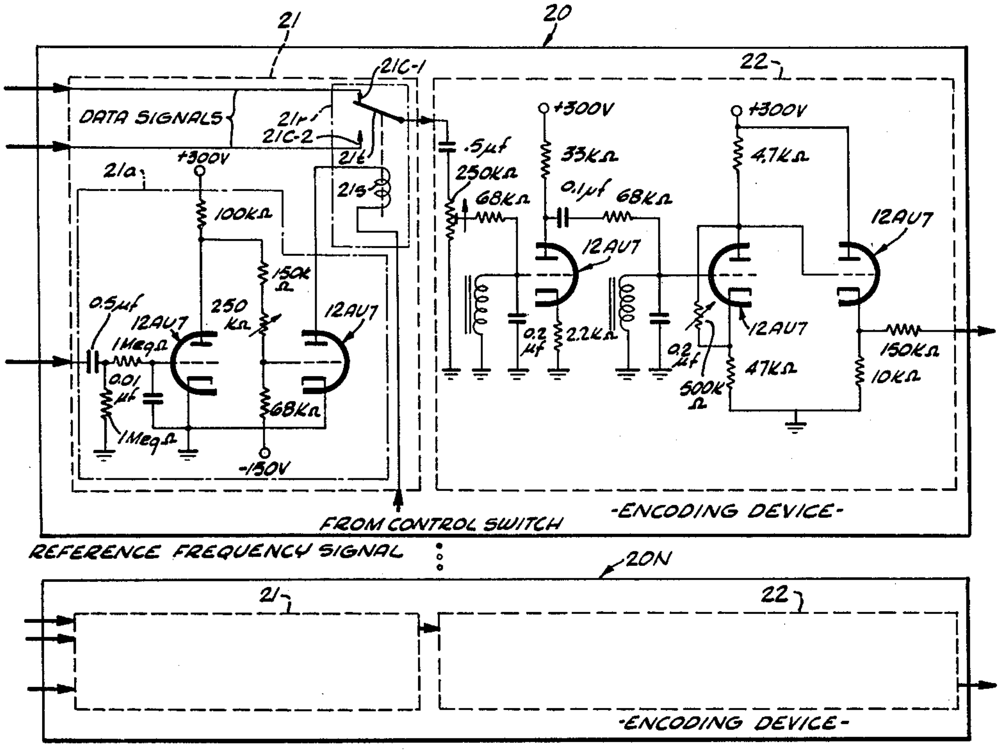
Fig. 2 is a schematic diagram illustrating a suitable form of encoding device 20 utilized in the transmitter section of Fig. 1.

One form which encoding devices 20 may assume is indicated in Fig. 2 where a detailed schematic diagram is shown. As indicated in Fig. 2, data devices 20 may each include a chopper and filter circuit 21 and an electronic phase shifter 22. Chopper and filter circuit 21 receives data signals to be converted which are applied to the contacts of a relay device *21r*. The solenoid portion *21s* of relay *21r* is actuated through an amplifier stage *21a* which may be of conventional design, suitable circuit values being indicated therein. Amplifier *21a* receives the reference frequency signal providing a sign reference and a data separation reference, as will be more fully understood when the decoding method of the invention is described below.

In this manner relay *21r* provides a squarewave output signal, derived through a transfer arm *21t*, having an amplitude corresponding to the data signal or difference of signals to be converted; and a frequency corresponding to the reference frequency signal applied to amplifier *21a*. The output signal is either in phase or out of phase with respect to the reference frequency signal, depending upon the sign of the data signal applied.

Where only a single data signal is to be encoded, one of the relay contacts *21c*–1 or *21c*–2 receives a fixed potential, such as ground, so that the amplitude of the squarewave signal which is produced is a function only of the data signal applied to the other contact. In other operations it may be desired to introduce an offset signal such as a glide path integral or course integral signal in which case the data signal and the offset signal are applied separately to contacts *21c*–1 and *21c*–2 and the resulting periodic signal has an amplitude corresponding to the difference between these signals.

If it is assumed that the positive amplitude of the reference signal results in an actuation of relay to a state where transfer arm *21t* is in an upper position, then it should be apparent that the difference signal between the signals applied to contacts *21c*–1 and *21c*–2 is in phase with the reference frequency signal when this difference is positive, and that the difference signal is 180° out of phase with respect to the reference signal when it is negative; except for phase lags which may be inherent in amplifier *21a* and relay *21r*.

The phase of the encoded data signal derived through circuit 21 may be adjusted in phase shifter circuit 22 in order to ensure the proper encoding thereof as may be determined through decoder 30 during a calibration operation to be described. Phase shifter circuit may be of conventional design and therefore will not be described in further detail, suitable circuit values being indicated.

*Frequency encoding device 40*

The transmitter section shown in Fig. 1 also includes a data signal to frequency encoding device 40 which may be utilized to supplement encoding devices 20. The encoding data signals provided by circuits 20 and 40 are applied to a modulator and output circuit 50 providing a carrier modulated output signal including all of the data which has been encoded.

A suitable form of data signal to frequency encoding device 40 is indicated to include a differential amplifier 41 receiving the input signal to be converted, which may measure range in miles in a typical example. Differential amplifier 41 then produces a corresponding output voltage which is utilized to actuate a sawtooth generator 42 having a periodic operation controlled by the voltage produced by amplifier 41. The variable frequency sawtooth signal produced by generator 42 actuates a flip-flop 43 producing a corresponding squarewave signal at the same frequency. This signal is passed through a filter 44 and converted to a corresponding sinusoid which is frequency modulated according to the amplitude of the corresponding data signal which is converted.

Encoding device 40 includes a feedback circuit for ensuring the accuracy of the conversion; the feedback circuit including a difference detector and integrator 45, providing a control signal for differential amplifier 41 corresponding to the difference in frequency between the output signal of flip-flop 43 and a reference signal derived through a shaper circuit 46. A particular schematic form for this arrangement is shown in Fig. 4.

A specific form of circuit 40 including such a difference detector is shown in Fig. 4 where it will be noted that a data signal to be converted, such as a range-representing signal, is applied to a differential amplifier 41. Amplifier 41 is conventional and therefore requires no further description.

The output signal produced by amplifier 41 is applied to a sawtooth generator 42 including a thyratron tube 42T which receives the signal produced by amplifier 41 as a grid bias. As a result the frequency of the sawtooth signal derived from the anode of tube 42T depends upon the amplitude of the output signal of differential amplifier 41. This varying frequency sawtooth signal is applied to a flip-flop circuit 43 actuating circuit 43 to produce a squarewave output signal having a half-period duration corresponding to the period of the sawtooth signal produced by circuit 42.

The output signal produced by flip-flop 43 is applied to a filter circuit 44 producing a sinusoidal output signal at the same frequency as that of the flip-flop signal. This signal then has a frequency corresponding to the amplitude of the data signal applied to amplifier 41. In this manner then a data signal to frequency conversion is effected. The frequency encoded signal is referenced to a signal applied through a shaper circuit 46 to a difference detector and integrator circuit 45, which produces an output signal having a level corresponding to the difference in frequency detected. As indicated in Fig. 4, circuit 45 includes thyratron circuits 45–1 and 45–2 for receiving the referencee frequency signal and the varying frequency flip-flop signal, respectively. Thyratron circuits 45–1 and 45–2 provide low impedance charging paths for respective integrating circuits 45–3 and 45–4 providing voltages corresponding to the frequency of the controlling signal. These voltages then are utilized to actuate a differential amplifier 45–5 producing a signal representing any difference between the varying flip-flop frequency and the fixed reference frequency applied to shaper circuit 46. This frequency-difference representing signal is applied as a feedback control signal to circuit 41.

Feeding back the difference frequency voltage in this manner to differential amplifier 41 ensures a more accurate linear conversion in the frequency range desired. In a typical application a range voltage signal may be converted in this manner to a varying frequency signal of the range of 23 c.p.s. to 43 c.p.s.

Difference detector and integrator 45 may be utilized in a similar manner in the receiver section, shown in Fig. 7; and specifically as frequency difference detector 79. In this application a reference signal of 23 c.p.s. again may be utilized to actuate thyratron 45–1 and a data signal detected through circuit 78, of Fig. 7, may be utilized to actuate thyratron 45–2 in circuit 45. In this manner then a frequency coded data signal which may illustratively represent range may be derived from circuit 45 by connecting a meter between the cathodes of differential amplifier 45–5.

*Output circuit 50*

The general form which circuit 50 may assume in a typical arrangement is indicated in Fig. 5 to include a frequency modulator 51 which receives the mixed encoded data signals produced by devices 20 and produces a corresponding frequency modulated carrier output signal. This frequency modulated carrier is applied to an amplitude modulator and clipper 52 which also receives the frequency encoded data signal produced by circuit 40. Circuit 52 is operative to superimpose the data presented by circuit 40 as amplitude modulation over the frequency modulated carrier produced by oscillator 51. It will be understood, however, that the superimposition of amplitude modulated data signals upon the frequency modulated data signals is an optional feature allowing the introduction of another encoded data signal but does not form an essential part of the invention.

The amplitude and frequency modulated signals produced by circuit 52 are applied to a filter 53 and thence to an amplifier and cathode follower circuit 54 providing encoded carrier output signals suitable for transmission. The frequency modulated signals are also passed through an amplitude limiter 55 and a discriminator and automatic frequency control circuit 56 to provide signals for actuating decoding circuit 30 allowing the calibration of encoding devices 20 to ensure the proper encoding of the data signals. The manner in which this calibration may be achieved will be discussed below.

The output signals produced by oscillator 51 are applied through an amplifier and phase splitter stage **51*a* to an amplitude modulator and clipper 52 which also receives amplitude modulating signals from filter 44 of frequency encoding device 40. The output signals produced by circuit 52 then include a frequency modulated carrier bearing the encoded data signals produced by devices 20 and also include an amplitude-modulated portion bearing the varying frequency signals produced by circuit 40. These signals are applied to a filter 53 which is designed to pass the desired frequency region for transmission and serves to eliminate unwanted frequencies or noise. The output signals produced by filter 53 are applied to an amplifier and cathode follower stage 54 providing the modulated subcarrier output signals, such as channel-N signals at 6.3 kc. It may be noted at this point that the advantageous feature of oscillator 51** is that it may be operated to provide any of the subcarriers indicated in Fig. 6 over a broad frequency modulating range.

*Reference frequency transmitter section and mixer of Fig. 6*

Reference is made to Fig. 6 where it will be noted that the typical reference frequencies 23 c.p.s., 35 c.p.s. and 43 c.p.s. are provided by respective oscillators **61*a*, 61*b*, and 61*n* and applied to corresponding amplifier, modulator, filter stages 62*a*, 62*b* and 62*n*. Stages 62 also receive corresponding subcarrier frequencies obtained through oscillators 63*a*, 63*b* and 63*n* driving frequency multipliers 64*a*, 64*b* and 64*n*, respectively. Multipliers 64*a*, 64*b* and 64*n*** are indicated as providing the fifth multiple of the frequencies 1060, 1000 and 1120 c.p.s. to produce subcarriers of 5.3 kc., 5 kc. and 5.6 kc.

The subcarriers modulated by the respective reference frequencies produced by circuit **62*a*, 62*b* and 62*n* are demodulated through corresponding circuits 65*a*, 65*b* and 65*n* to provide reference signals utilized to actuate decoding device at the transmitter for controlling the calibration operation described below. In addition, these signals are applied to a mixer 66 which may also receive control subcarriers from other coders indicated to be obtained from channels N, O, P, Q, R and S, on subcarriers of 6.3 kc., 7.0 kc., 8.4 kc., 9.1 kc., 9.8 kc., illustrating a typical utilization of the invention. In addition, it may be desired to mix certain audio signals through stage 66 provided through an audio amplifier 67**.

The particular subcarrier frequencies have been selected to provide a convenient mode of calibration. According to the method employed, an accurate oscillator circuit 68–1 is utilized in a test arrangement 68 to provide a basic frequency such as 700 c.p.s. The subcarrier of 5.6 kc., is mixed with this reference frequency of 700 c.p.s. in a mixer stage 68–2 so that a series of harmonics are available which may be utilized as a reference to check any of the subcarriers utilized to carry the data signals from any of the channels N, O, P, Q, R, or S. In this manner a convenient reference is available for calibrating all of the subcarriers.

From this description it should be apparent that the transmitter section shown in Fig. 6 provides an output signal through mixer 66 which includes all of the reference signals associated with corresponding subcarriers and also includes a plurality of control or other data signals on as many subcarriers as may be required for the particular control application. In a typical situation each of the control subcarriers may be utilized to guide a different aircraft; as, for example, in a multiple automatic ground-controlled approach system.

*Decoder 30*

The encoder data provided in the transmitter section shown in Fig. 1 may be displayed to ensure the proper transmission thereof by means of a decoding circuit 30 indicated to include phase detector devices 30A and 30B. It is important to note that the decoding method utilized to provide a display at the transmitter to ensure the proper encoding of data signals may be the same as that utilized in the receiver. Consequently, the decoding method and circuits will be described once to cover the possibility of utilization at the transmitter for controlling the encoding operation as will as the utilization at the receiver for decoding the signals transmitted.

Referring now to Fig. 3, it is noted that in a typical arrangement phase detector 30 may include a first cathode follower input stage 31 for receiving a reference frequency signal indicated as $S_{ref}$ and a second cathode follower input stage 32 for receiving the mixed encoded data signals referred to as $S_{data}$. Cathode follower stages 31 and 32 may be conventional and will not be further described except to note that stage 32 includes a potentiometer P32 which may be varied to change the fractional relationship between the $S_{data}$ signal passed through with respect to the $S_{ref}$ signal passed through stage 31.

The reference output signal $S_{ref}$ produced by circuit 31 is transformer coupled to one input end of balanced diode bridge circuit 33 in a conventional manner. In a similar manner, the output signal $S_{data}$ produced by cathode follower stage 32 is transformer coupled to the other input end of bridge 33. It will be noted that bridge 33 is coupled to an integrating output circuit comprising resistors 34 and 35 and capacitors 36 and 37. Phase detector circuit 30 may be conventional is design although it will be apparent its method of utilization is unique. An output signal is obtained at the output of balanced diode bridge 33 in circuit 30 where a vector signal is available corresponding to the polar vector variable indicated in the diagram of Fig. 3*a*.

Referring now to Fig. 3*a*, it is noted that a plurality of vector plots are presented for various ratios between $S_{data}$ and $S_{ref}$. It will be further noted that the diagram is symmetrical about a phase line running from 90° to 270°. An important thing to note in Fig. 3*a* is that as $S_{data}$ becomes much smaller than $S_{ref}$, the amplitude variation of the phase detector output, in the neighborhood of 0 or 180°, is very closely related to the signal $S_{data}$. At 0° $S_{out} \cong KS_{data}$ and at 180° $S_{out} \cong -KS_{data}$ where K is determined according to the transfer function of circuit 30.

The other important thing to note about phase detector circuit 30 is that the inclusion of the integrating elements 34, 35, 36 and 37 ensures an average zero output signal for any frequency component which differs substantially from the frequency of $S_{ref}$. Thus decoder circuit 30 may be operated to separate out a desired data signal from a mixture of a plurality of such signals and to translate the selected signal into an output voltage having a signed vector amplitude.

Let it be assumed for the purpose of this illustration that two data signals representing, for example, glide path error and course error have been mixed and are to be separated through individual detector circuits such as 30A and 30B shown in Fig. 1. To achieve this operation then the glide path reference frequency signal, assumed to be 43 c.p.s., is applied to the $S_{ref}$ input terminal of phase detector 30B. The glide path and course data signals then are applied to respective $S_{data}$ input terminals in detectors 30A and 30B. Considering for the moment the operation of detector 30A, it will be noted that the course data differs in frequency at 8 c.p.s. from the reference signal of 35 c.p.s. to applied detector 30A with the result that its average integral value is zero and will not appear, except perhaps as a small D.C. ripple in the indication on the transmitter control indicator.

Moreover, the ratio of $S_{ref}$ to $S_{data}$ is selected to be in the order of 5 to 1 so that the glide path data signal which is detected is quite accurately represented by the function: $S_{out} \cong KS_{data} \cos \theta$, where $\theta$ is either 0 or 180°; so that $S_{out}$ is approximately equal to $+KS_{data}$ or $-KS_{data}$, depending upon the encoded phase relationship provided by device 20 in the manner described above.

In a similar manner, the glide path error data signal is averaged out to zero in detector circuit 30B and the desired course data signal is converted to a corresponding signal with the proper amplitude and sign.

At this point, it is convenient to consider the manner in which the phase and amplitude of the transmitted encoded data signal is controlled so that it accurately represents the corresponding data. The reference signal utilized to control decoder 30, shown in Fig. 1, is derived from demodulators 65*b* and 65*n* providing glide path and course reference signals, respectively. It will also be noted that the frequency modulated carrier produced by oscillator 51 shown in Fig. 1 is effectively demodulated through discriminator 56 so that the encoded data signal actually transmitted is presented to decoding circuit 30. In this manner then phase shifters 22 in encoding devices 20 may be adjusted until the transmitter control indicator indicates the proper sign relationship for a given data input signal and appropriate modification may be made in amplifier 21*a* to obtain the desired amplitude representation of the absolute value of the data encoded.

It is important to note in this connection that the encoding method of the invention allows a considerable variation in phase before any error in sign is introduced. The reason for this is that there are only two possible phase relationships, namely an in-phase or 0° phase difference, and an out-of-phase or 180° phase difference. Thus no ambiguity exists in the encoding of the sign unless an error in phase exists in the neighborhood of 90°.

Although conventional circuit means may be utilized to modulate a subcarrier with the data signals encoded according to the method of the invention, a preferred arrangement is shown in Fig. 5 to aid those skilled in the art. In referring to Fig. 5 it is noted that the preferred arrangement includes a frequency modulated oscillator 51.

The reference and data signal bearing carriers provided by the transmitter section shown in Fig. 6 are received by a typical receiver arrangement shown in Fig. 7 where the reference signals are separated out through respective selected amplifier stages 71*a*, 71*b* and 71*c*. In addition, the mixed data and reference signals are passed through a local oscillator and mixer stage 72, an IF amplifier stage 73, and a discriminator stage 74 producing mixed data signals similar to those appearing at the output of discriminator 56 shown in the transmitter section of Fig. 1. It will be noted that a channel selector signal controls local oscillator and mixer 72 so that the desired one of the control subcarriers N through S is selected. It will be understood, of course, that the invention may be practiced as well in a system where but a single control subcarrier is transmitted and only one aircraft is controlled.

The reference signals derived through amplifiers 71a, 71b and 71n are applied to a set of phase shifter circuits 75 providing a proper reference phase at the receiver, the resulting signals then being utilized to actuate corresponding phase detector circuits 76a, 76b and 76n. Phase shifter and detector circuits 75 and 76 may be of the same type as is shown in Figs. 2 and 3, and the operation thereof is the same as described above. The output signals produced by the phase detectors then represent corresponding separated data signals and are utilized to control corresponding displays on speed and glidepath-course indicating devices 77a and 77bn. The output signals produced by amplifier 73 are also applied to a modulation detector 78 which produces an output signal corresponding to the amplitude modulated portion of the subcarrier passed therethrough. In a typical operation this signal may represent range and is applied to a frequency-difference detector 79 which also receives a reference signal such as 23 c.p.s. Circuit 79 produces an output signal corresponding to the amplitude of the data signal which had previously been frequency encoded in circuit 40, in the transmitter section of Fig. 1. In a typical utilization this data may represent range and is indicated to control an indicator device 79a.

The embodiment of Fig. 7 is also shown as including a voice filter 80 and a voice key relay 81 which may be included in the system of utilization for a particular application. These devices form no part of the present invention and therefore will not be discussed in further detail.

It should be noted that frequency difference detector 79 may be similar to difference detector 45 shown in Fig. 1 where a reference frequency signal is compared to a variable frequency signal and a varying amplitude signal is produced corresponding to this difference.

From the foregoing description it is apparent that the present invention provides a method and a basic class of circuits for encoding and/or decoding a plurality of data representing signals where an auto-correlating phase comparison is utilized to distinguish difference encoded signals as well as to provide an accurate indication of the sign of the respective signals.

The invention has been particularly illustrated with reference to a utilization for aircraft control where a data link for telemetric signals is maintained for automatic ground controlled approach. Thus frequent reference has been made to range, speed, glidepath and course signals. However, it will be understood that the basic techniques introduced herein may be utilized in any telemetering system where a plurality of control or other information bearing signals are to be transmitted.

It has been pointed out that the practice of the invention obviates the necessity of providing a plurality of filter circuits for separating data signals encoded according to prior art techniques.

Furthermore, it should now be apparent that the sign encoding method of the invention making it unnecessary to establish a reference level signal provides a decided improvement in the art. It has been pointed out that the method of the invention may allow considerable variation in phase encoding without any introduction of error in sign.

Many of the circuits utilized in practicing the methods of the invention have been noted to be conventional. It will be understood, however, that where a conventional circuit is functionally operated to provide a new result, a new set of function means effectively results. Thus the phase detector circuit utilized according to the decoding method of the invention is in reality a new circuit in terms of the functional operation of the means. Thus by properly selecting the ratio of the reference and data signals utilized to actuate the phase detector circuit, the function of the circuit is changed from a normal simple phase detecting operation to one of signal separation by auto-correlation and amplitude detection.

While a considerable number of important variations have been pointed out where significant, it will be understood that many other variations are possible. Thus the specific reference to such variations has not been intended to exclude others which will be apparent to those skilled in the art.

What is claimed is:

1. A data link for simultaneously transmitting several sets of several variables, the data link having a corresponding receiving station for each of said sets, said data link comprising: means for producing a predetermined number of reference signals of different predetermined frequencies, each of said reference signals corresponding to one variable in each set; means for producing an amplitude modulated signal for each variable in each of said sets, each of said amplitude modulated signals in each of said sets having the same frequency as a corresponding one of said reference signals and having a phase differing from that of its corresponding reference signal by zero degrees when said corresponding variable is of one algebraic sign and having a phase differing from that of its corresponding reference signal by 180 degrees when said corresponding variable is of the opposite algebraic sign; means for modulating a subcarrier wave with each amplitude modulated signal for producing a subcarrier wave for each of said sets of variables; means for adding the amplitude modulated signals corresponding to the variable in each set together and for modulating the subcarrier wave with the sum of the amplitude modulated signals of a corresponding set of variables; means for transmitting each of said subcarrier waves with each of said reference signals to each of the receiving stations; means at each of said stations to receive all of said reference signals but to receive a different one of said subcarrier waves; detector means at each of said stations to modulate a corresponding subcarrier wave to produce the amplitude modulated signals; means at each receiving station to separate said reference signals; a phase detector at each receiving station for each of said reference signals responsive both to the output signal of said detector means and to a corresponding one of said reference signals for both separating the amplitude modulated signals at the output of each of said detector means and for producing a direct-current voltage having a magnitude proportional to that of a corresponding variable and a polarity representative of the algebraic sign of said corresponding variable.

2. A single channel plural signal data link for the transmission and reception of a plurality of variables simultaneously, said data link comprising: means for producing a predetermined number of reference signals of different predetermined frequencies, each of said reference signals corresponding to one of said variables; means for producing an amplitude modulated signal for each variable, each of said amplitude modulated signals having the same frequency as a corresponding one of said reference signals and having a phase differing from that of its corresponding reference signal by zero degrees when said corresponding variable is of one algebraic sign and having a phase differing from that of its corresponding reference signal by 180 degrees when said corersponding variable is of the opposite algebraic sign; means for adding said amplitude modulating signals together to produce a composite signal; a receiving station; means for transmitting said composite signal and all of said reference signals to said receiving station; means at said receiving station to separate said reference signals; a phase detector at said station for each of said reference signals responsive both to said composite signal and to a corresponding one of said reference signals, said reference signals being large in amplitude in comparison to corresponding amplitude modulated signals in said composite signal, said phase detectors thereby both separating the amplitude modulated signals incorporated in said composite signal and for producing a direct-current voltage having a magnitude proportional to that of a corresponding variable and a polarity representative of the algebraic sign of said corresponding variable.

3. The invention as defined in claim 2, wherein an integrator circuit is connected from the output of each of said phase detectors.

4. In a device for producing an alternating output signal having a predetermined fundamental frequency, an amplitude proportional to that of a data input signal with respect to that of a predetermined reference level input signal, and a phase representative of the polarity of said data input signal with respect to said reference level input signal, the combination comprising: means for producing an alternating selection signal having a fundamental frequency equal to that of said predetermined fundamental frequency; and gating means responsive to said selection signal for alternately passing only one of said input signals when said selection signal is in its high amplitude swing and for passing only the other of said input signals when said selection signal is in its low amplitude swing.

5. The invention as defined in claim 4, wherein an output circuit is additionally provided including means for passing only the alternating component of the output signal of said gating means of said predetermined frequency, whereby the output signal of said output circuit is an alternating signal having a fundamental frequency differing in phase from that of said selection signal by zero or 180 electrical degrees dependent upon the polarity of said data input signal with respect to that of said reference level input signal.

6. In a device for producing an alternating output signal having a predetermined fundamental frequency, an amplitude proportional to that of a data input signal with respect to that of a predetermined reference level input signal, and a phase representative of the polarity of said data input signal with respect to said reference level input signal, the combination comprising: an output circuit including a filter to attenuate alternating signals of frequencies higher than said fundamental frequency; means for producing an alternating selection signal having a fundamental frequency equal to that of said predetermined fundamental frequency; and gating means responsive to said selection signal for alternately passing only one of said input signals to said output circuit during a high amplitude swing of said selection signal and for passing only the other of said input signals to said output circuit during a low amplitude swing thereof.

7. In a device for producing an alternating output signal having a predetermined fundamental frequency, an amplitude proportional to that of a data input signal with respect to that of a predetermined reference level input signal, and a phase representative of the polarity of said data input signal with respect to said reference level input signal, the combination comprising: an output circuit including a filter to attenuate alternating signals of frequencies higher than said fundamental frequency; means for producing an alternating selection signal having a fundamental frequency equal to that of said predetermined fundamental frequency; gating means responsive to said selection signal for alternately passing only one of said input signals during a high amplitude swing of said selection signal and for passing only the other of said input signals during the low amplitude swing of said selection signal; and a phase detector responsive to the output of said output circuit and responsive to said selection signal for accurately reproducing said data input signal both as to its magnitude and as to its polarity.

8. A system for reproducing a direct-current data input signal at a remote location accurately representing a variable input at a transmitter location, said system comprising: first means for producing a direct-current data input voltage in accordance with said variable; second means for producing a direct-current reference level input voltage; third means for producing an alternating selection voltage; a relay having a winding adapted to be energized during only one of the high and low swings of said selection voltage, said relay also having a pole output to contact selectively one of two input contacts connected to said first and second means, respectively; fourth means to filter the output of said relay appearing at said pole to produce an alternating output voltage having the frequency of the output of said third means; and a phase detector responsive to the output of said third means and to said alternating output voltage of said fourth means for reproducing said data input voltage signal.

References Cited in the file of this patent

UNITED STATES PATENTS

| | | |
|---|---|---|
| 2,236,374 | Marrison | Mar. 25, 1941 |
| 2,414,318 | Middel | Jan. 14, 1947 |
| 2,474,244 | Greig | June 28, 1949 |
| 2,521,531 | Mikelson | Sept. 5, 1950 |
| 2,526,425 | Schultheis | Oct. 17, 1950 |
| 2,542,627 | Chevallier | Feb. 20, 1951 |
| 2,562,682 | Schmitt | July 31, 1951 |
| 2,740,950 | Grillo | Apr. 3, 1956 |

OTHER REFERENCES

"Theoretical Analysis of Various Systems of Multiplex Transmission," RCA Review, vol. IX, No. 2, June 1948 (p. 291 relied on).

UNITED STATES PATENT OFFICE

CERTIFICATE OF CORRECTION

Patent No. 2,918,665 December 22, 1959

Harry Theodore Hayes et al.

It is hereby certified that error appears in the printed specification of the above numbered patent requiring correction and that the said Letters Patent should read as corrected below.

Column 2, line 42, for "in" read -- on --; column 5, line 38, for "5.35" read -- 5.3, 5.0 --; column 9, line 30, for "will" read -- well --.

Signed and sealed this 23rd day of August 1960.

(SEAL)
Attest:

KARL H. AXLINE
Attesting Officer

ROBERT C. WATSON
Commissioner of Patents